July 7, 1953 — A. W. ANDERBERG — 2,644,193
SPRING SASH BALANCE

Filed Nov. 17, 1950 — 2 Sheets-Sheet 1

INVENTOR.
Axel W. Anderberg
BY
Knight & Rodgers
ATTORNEYS.

July 7, 1953  A. W. ANDERBERG  2,644,193
SPRING SASH BALANCE

Filed Nov. 17, 1950  2 Sheets-Sheet 2

INVENTOR.
Axel W. Anderberg
BY
Knight & Rodgers
ATTORNEYS.

Patented July 7, 1953

2,644,193

UNITED STATES PATENT OFFICE 2,644,193

SPRING SASH BALANCE

Axel W. Anderberg, Los Angeles, Calif.

Application November 17, 1950, Serial No. 196,320

7 Claims. (Cl. 16—197)

The present invention relates generally to new and novel features of spring sash balances, and more particularly to improvements in the means for fastening and guiding the springs in sash balances.

Sash balances of this type generally comprise a housing containing a spring balance unit or two spring balance units which are duplicates of each other. Each unit includes an axle upon which a drum is rotatably mounted. A spirally coiled spring connects the axle to the drum and the drum has wound upon it a cable which is attached to a sash. In the case of a double unit the two cables coming out of the bottom of the housing are attached one to the upper sash and one to the lower sash. The spring within each drum tends to wind up the drum and thereby exerts a pull on the cable which counterbalances the weight of the sash.

In conventional types of construction of sash balances, the drum is mounted to rotate about a fixed hub or axle. The drum is formed of sheet metal and ordinarily the bearing between the drum and its axle is limited to the thickness of this metal sheet from which the drum is formed. Such a narrow bearing frequently causes extremely rapid wear of the axle and the central bearing of the rotating drum; and this condition is particularly true where one part has sharp or ragged edges which score the other part to such an extent that the central bearing for the drum becomes out of round and tilts. Eventually the drum becomes noisy and sooner or later it jams, failing to rotate. After this condition once starts, it seems to accelerate wear which continues to the point at which the drum binds, being more free to lean, and fails to function properly.

In the usual construction, the drum has a side wall or face which bears against the balance housing; and as long as this engagement is maintained the drum is held in the proper upright position to resist eccentric loading applied to it by the cable attached to the sash. However, because of the narrow width of the bearing between the drum and the axle the drum often times tilts on its bearing. This condition is accentuated when the bearing becomes worn as just described. The tilting of the drum not only wears the bearing at the axle but also brings the rim of the drum at the top of the opposite side in contact with the inner face of the housing. In addition to the undesirable wear on the rim of the drum and the housing resulting from such engagement, the drag on the drum causes it to rotate unevenly in a jumpy manner.

In addition to the annoyance caused by a sash balance that does not work smoothly and properly, the vibration set up by improper operation, combined with the flexing of the spring as it winds and unwinds, causes the end of the spring to creep slightly at the point where it is anchored to the fixed axle. In order to make for speed and cheapness of assembly, it is not customary to provide a positive connection between the inner end of the spring and the axle but merely to secure the parts together frictionally. This minute movement imparted to the spring from the causes described, causes the spring end to creep in a direction to disengage it from the axle and this sometimes occurs after long usage. The result is a completely inoperative sash balance which must be replaced.

It thus becomes a general object of my invention to provide an improved connection at the inner end of a sash balance spring attaching it to the axle in order to effect a positive connection between these members but one which can still be made quickly and easily.

It is also an object of my invention to provide an improved form of sash balance in which the rotating drum is provided with a wider bearing on the stationary axle while the spring is constructed in a manner to accommodate this wider bearing and not to reduce the effective width of the spring.

The above and other objects and advantages of my invention have been attained by providing an improved form of sash balance in which the stationary axle being hollow is provided with a longitudinally extending slot having a recess at one or both sides of the slot. The recess is shorter than the axial dimension of the slot and thus forms a pair of shoulders, one at each end of the recess. The drum is rotatably mounted upon the axle and a spiral spring inside the drum is connected at its outer end to the drum and at its inner end to the axle. At its inner end, the spring has a section of reduced width providing shoulders which engage the aforementioned shoulders on the inside of the axle when the narrow section of the spring extends out of the axle through the recess. The shoulders on the spring are preferably spaced from the end of the spring a distance equal approximately to three-fourths of the inside diameter of the axle.

The side wall of the drum is provided with an inwardly turned flange around the opening through which the axle extends, this flange providing a substantial increase in the bearing area of the drum on the axle over the bearing afforded by the thickness of the sheet alone. By notching the spring to a depth slightly in excess of the length of the flange, the notch serves not only to provide at one end the shoulder engaging the hub inside but as a means for clearing the drum flange and allowing the spring throughout its effective length to be substantially the full width of the drum.

In a variational form of my invention, I place a sleeve around the central axle, the sleeve thickness being the same or somewhat less than the radial width of the drum flange. The sleeve may be used at any time, but is especially useful with relatively thin spiral springs in preventing abrasion of the flange by the spring. Use of the sleeve enables the notch in the spring to be shortened as the sleeve holds the initial turn of the spring away from the axle.

How the above objects and advantages of my invention, as well as others not specifically referred to, are attained will be more readily understood by reference to the following description and to the annexed drawings, in which.

Figure 1:
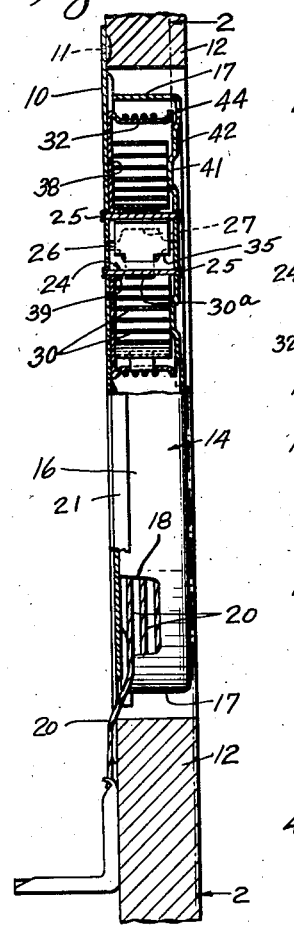
Fig. 1 is a view showing an improved form of sash balance, consisting of two units, installed in a window casing, the view being partly in vertical median section and partly in side elevation.
Figure 2:
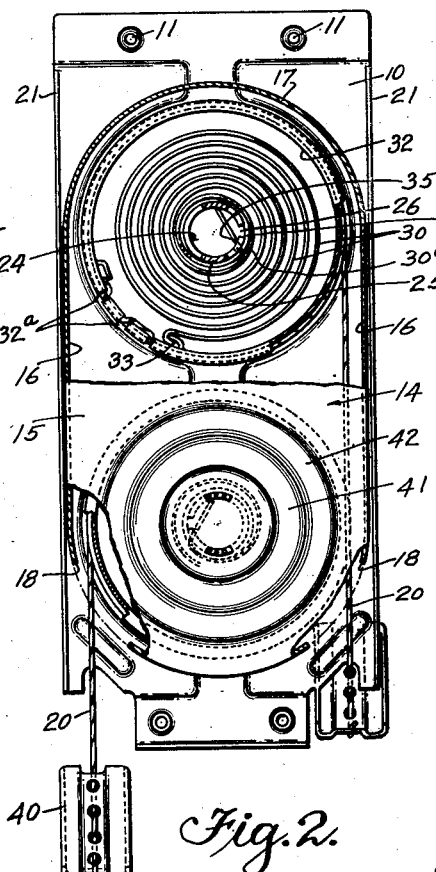
Fig. 2 is a combined section and rear elevation on line 2—2 of Fig. 1, part of the housing being broken away to show the upper unit.

Referring now to the drawings, the housing of the sash balance is in two parts. One portion is a rectangular face plate 10 which is provided at the upper and lower ends with countersunk apertures 11 through which nails or screws may be passed to fasten the sash balance to window casing 12, as shown in Fig. 1. The other portion of the housing is cover 14 which is in the shape of a shallow box normally formed by a die stamping operation. The box-like cover is generally rectangular in outline and includes a flat plate-like portion 15 to which two parallel side walls 16 and two curved end walls 17 are integrally connected. At the lower end, two openings 18 are provided in the cover for passage of the flexible cables 20, as will be further described. It is also preferable to cut away the lower corners of face plate 10 as shown in Fig. 2 in order to eliminate any sharp bend in a cable as it leaves the balance housing and passes down the inside surface of window frame 12. In width, cover 14 is slightly less than the full width of face plate 10 and fits snugly between shallow longitudinal side flanges 21 at either side of the face plate 10.

Two axle members 24 are attached to face plate 10 at vertically spaced positions. These two axle members are the same in all respects; therefore only one of them is shown and described in detail. As shown particularly in Fig. 5, each axle 24 is a hollow, tubular member provided at each end with a pair of projections or lugs 25 which are long enough to extend through face plate 10 or cover 14 as the case may be. The outer ends of one pair of projections 25 are upset or flattened by any one of various procedures to fasten the axle securely to the face plate at one end. At the other end, projections 25 extend through cover 14 and are likewise upset to provide a firm connection between the cover and axle. In this way the cover is held in place by the two axles to complete the enclosure of the two drums and the other internal parts of the sash balance.

Axle 24 has a longitudinally extending slot 26 which extends for the full length of the axle and is open at each end. At at least one side of slot 26, and preferably at both sides, is a recess 27 in the wall of the axle which is centrally disposed with respect to the length of the axle and slot 26 in order to leave at each end of recess 27 a short lug 28 which is an integral portion of the axle. Although one such recess 27 is sufficient for a single unit balance, it is preferable to provide two recesses in order that the axle is entirely symmetrical and may therefore be assembled with either end in engagement with the face plate and still properly receive the spring of either unit, as will become apparent. One or two recesses 27 produce in slot 26 an intermediate portion of increased width.

Coil spring 30 surrounds axle 24 and is contained within drum 32 which is rotatably mounted upon the axle. The outer end of spring 30 is fastened to the inside of drum 32 at 33 in any suitable manner. The connection is here shown as being accomplished by bending over the extreme end of the spring to form a hook-like terminal which engages a raised tab formed integrally within the drum. The tension on the spring keeps the spring and the tab always in engagement. Any other suitable type of connection at this point may be used if desired.

Figure 3:
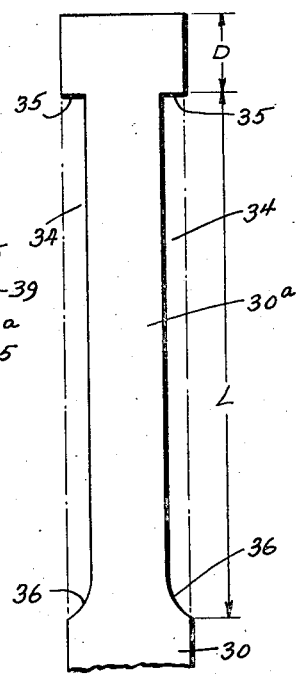
Fig. 3 is an enlarged plan view of a part of the spring at the inner end showing the shoulders which engage the axle and the notched section forming said shoulders.
Figures 5, 6:
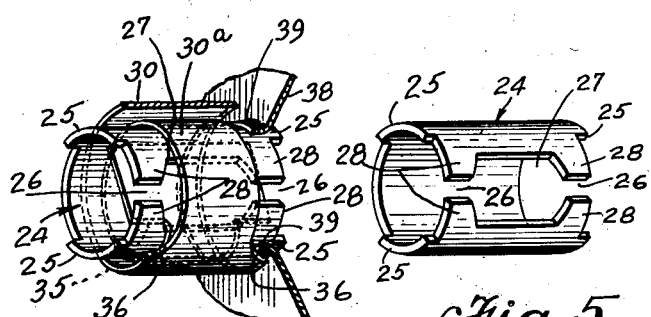
Fig. 5 is a perspective view of an axle detached from the housing.
Fig. 6 is a fragmentary perspective view of the axle showing the inner end of the spring attached thereto, and a cutaway section of a portion of the drum as it bears around the axle.
Figure 4:
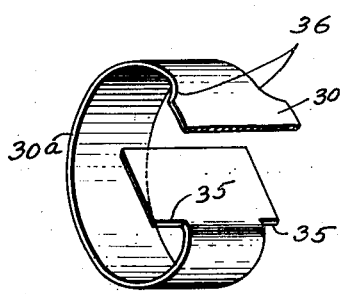
Fig. 4 is an enlarged fragmentary perspective view of the spring at the inner end but with the spring coiled.

The inner end of the spring is connected to axle 24, as shown particularly in Figs. 2 and 6. The spring is formed from a strip originally uniform in width throughout its entire length; but according to my invention the inner end of the spring is notched as shown in Fig. 3. A cutaway section 34 at one side of this spring at least, and preferably at both sides as shown, is made by removing one or two narrow elongated portions of the spring lying between the dot-dash lines showing the original outline and the solid lines of Fig. 3. The end of notch 34 near the extreme inner end of the spring is squared off as shown in Fig. 3 to provide a shoulder 35 which is adjacent to but spaced a short distance D from the extreme end of the spring. With a notch 34 on each side of the spring, there are a pair of such squared shoulders 35. For reasons that will become apparent, the end of each notch 34 is so located that shoulder 35 is spaced from the end of the spring a distance less than the inside diameter of axle 24, this distance D preferably being equal to approximately three-fourths the inside diameter of the axle.

The length of the notch L may vary with the thickness and/or stiffness of spring 30, but in general it is preferably in excess of the external circumference of axle 24 with the construction shown in Fig. 2. The other end of the notch at 36 may be squared but is preferably rounded as shown.

Connection of the inner end of spring 30 to axle 24 is accomplished easily during the assembly of the parts. All that is necessary is to insert the end of the spring into the axle through slot 26 and bring portion 30a of reduced width of the spring out of the axle through a recess 27. A pull on the spring brings shoulders 35 of the spring into engagement with the inside of the axle at lugs 28. The pull of the spring swings the terminal section D around within the axle until the end of the spring engages the inside of the axle at some such position as shown in Figs. 2 and 6. It will be readily appreciated under the circumstances that the length of spring D beyond shoulders 35 is made shorter than the internal diameter of axle 24 in order to fit within the axle; but an adequate clearance for the parts without making the spring too short is had when this distance, shown in Fig. 3, is equal to approximately three-fourths the internal diameter of the axle.

Each drum 32 is cylindrical in outline and is provided at one side with an integral sidewall 38. The other end of the drum is open making the drum cup-like when viewed from that end. Wall 38 is provided with a centrally located opening surrounded by a short, inwardly drawn flange 39. Axle 24 extends though this central opening and is surrounded by flange 39 which forms a bearing for the drum engaging the axle.

In a sash balance of this type, the maximum width of the coil spring is determined by the axial length of axle 24 since the two axles form spacers between face plate 10 and the parallel plate 15 of cover 14. However, drum flange 39 covers a portion of slot 26 in the axle and has the effect of further reducing the width of spring that can be used if the spring is of uniform width throughout its length. By providing at least one notch 34 in the side of the spring which is deep enough and long enough to clear flange 39, as may be seen in Figs. 1 and 6, the spring may be returned to its maximum possible width after it has cleared this flange. When no sleeve around the axle is used as described below, the portion of reduced width 30a is typically made slightly longer than the external circumference of the axle in order that the reduced width of the spring is maintained for the first full turn. The reduced width portion is then long enough to pass over and beyond flange 39 as it spirals away from the axle.

The strip of spring stock is annealed prior to cutting and notching, and so is relatively soft. As a consequence the spring lies fairly closely to the axle, its exact position being determined by the tension in the spring and the thickness of the spring. Figs. 2–6 are intended to illustrate a heavy or thick spring, by which is meant a spring in the range of .022–.026 inch or thicker. A spring of this type has sufficient inherent stiffness that in one turn or less the end 36 of notch 34 is well outside the drum flange. With a medium spring, about .018–.022 inch thick a full turn or a little more may be required. For lighter springs the situation is discussed below.

Fig. 3 shows a portion of the spring near the inner end as it appears when it is flattened out or when it is a strip before being coiled. After the spring has been coiled, the same inner portion appears as in Fig. 4. The initial turn is of larger diameter than when in the drum and consequently is somewhat less than a complete circle, because the spring is shown as it appears when free from the tension under which it is placed when the spring is in place within a drum as in Fig. 2.

Each of the two drums 32 has a cable 20 on it. One end of the cable is connected to the drum by weaving it in and out through a plurality of slots 32a, or in any other desired manner. After making three or four complete turns about the outside of the drum, the cable passes downwardly and out of the balance housing. The lower end of each cable is fastened to an angle clip 40 which in turn is fastened to a sash. The cables are wound on to two drums in such a way that the drums revolve in opposite directions for movement of the cable in a given direction; thus the upper drum revolves clockwise and the lower drum counter-clockwise as cables 20 are pulled down out of the housing. It is desirable from a standpoint of manufacture to make as many parts exactly alike as possible since this not only reduces the capital investment required for tooling but also simplifies assembly operations. For this reason, axles 24, springs 30 and drums 32 are all made so that they may be used interchangeably in both the upper or lower positions; and it is for this reason that certain openings or shapes, such as recess 27 and notch 34, are duplicated though only one is in use at any given time. However, it is within the scope of my invention to provide each coil spring 30 with only a single notch and each axle 24 with only a single recess 27 since this is adequate in single unit balances and also permits these parts to be used in the upper or the lower position of a double unit balance according to the location of the notch and/or recess.

As mentioned above, the maximum possible width of the coil spring is the distance between the inner faces of face plate 10 and cover 14. Actually the coil spring should be somewhat less than that in order to provide adequate clearances. Also, greater clearance is required at 44 between the rim of the drum and the inner face of the cover in order to avoid having the drum scrape on the cover. An improved operation of the drum and coil spring can be accomplished by embossing the main plate portion 15 of cover 14 as shown in the lower half of Fig. 2. By embossing the cover to provide an inwardly offset annular area 41 which is located concentrically with the axis of axle 24, this embossed area of the plate bears lightly against one side of coil spring 30. In practice the embossment is deep enough to provide a maximum clearance between the spring and the embossed area on the cover of about .010 inch; but in actual practice the spring bears against the plate lightly since the spring is otherwise free to move away from side plate 38. The embossed area cooperates with side plate 38 of the drum to confine and guide the spring as it coils and uncoils. Furthermore the light pressure imparted to the spring is transmitted to drum plate 38 which tends to offset the eccentric loading imparted to the drum by the pull on cable 20. This pressure on the spring tends to keep the drum in a properly upright position and to maintain adequate clearance at 44 between the cover and the adjoining rim of the drum.

Opposite each drum 32, the plate is embossed to offset it inwardly within the circular line 42. A further inward offset is then given to the annular area at 41. In this way the total depth of the embossment is accomplished in two stages rather than in one which has certain practical advantages.

When it is desired to produce a sash balance with a comparatively light pull, this is generally accomplished by using a thinner spring, since for reasons pointed out above it is desirable that the width of the spring be maintained constant as are all other dimensions of the balance. To make such a sash balance, it may be desired to use a spring which is relatively thin or light, for example near or within the range of .014-0.18 inch thick which is only approximately one-half the radial thickness of drum flange 39.

A thin spring of this character is easily flexed and its normal pull is sufficient to wrap it on axle 24 for about one to two complete turns. When this is the case, notch 34 must be made quite long, as for example two or more times the circumference of axle 24, in order that the rounded shoulder 36 at the end of the notch may certainly be completely outside the flange on the drum. Otherwise this rounded shoulder rides on the flange with resultant jumpy uneven motion of the balance unit and eventual scraping away of a large portion of the flange.

Figure 7:
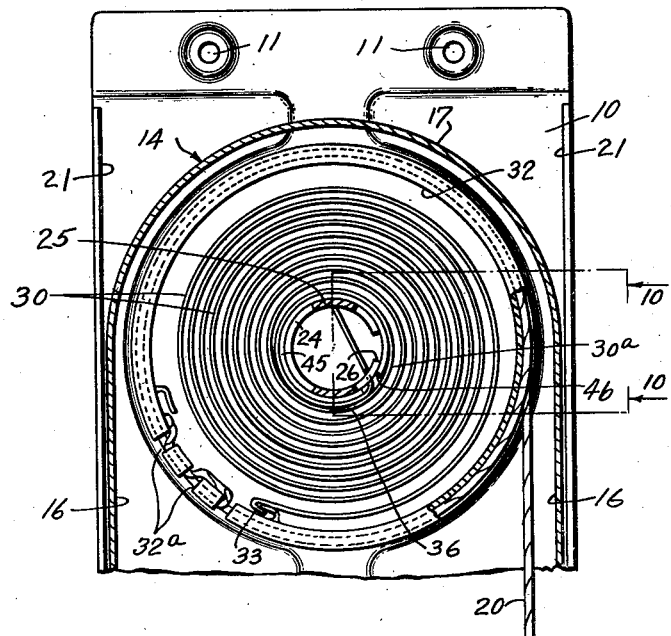
Fig. 7 is an enlarged fragmentary view similar to Fig. 2 showing a sleeve surrounding the axle of the upper unit.
Figure 8:
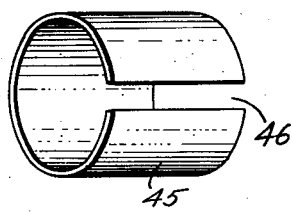
Fig. 8 is a perspective of the sleeve alone.
Figure 9:
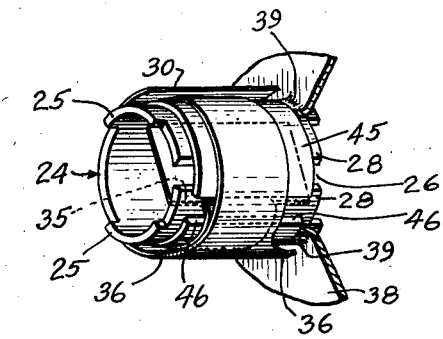
Fig. 9 is a perspective similar to Fig. 6 showing a sleeve in place on an axle.

I have found that this condition can very easily be eliminated by the addition to the structure previously described of annular sleeve 45, shown in Fig. 8. The internal diameter of this sleeve is very slightly larger than the external diameter of axle 24 so that the sleeve fits over the axle with a loose sliding fit. Sleeve 45 has a single longitudinally extending slot 46 which permits the spring to pass outwardly through the sleeve, as may be seen in Fig. 7. The slot in the sleeve does not line up with slot 26 in the axle since the pull of the spring is sufficient to rotate the sleeve about the axle to some such position as shown in Figs. 7 and 9 in which the sleeve more or less covers axle slot 26, depending upon the relative widths of these two slots. It will be seen that the action of the sleeve in covering slot 26 acts as a further safeguard to insure that the end of the spring is positively locked inside the axle and cannot come out.

Figure 10:
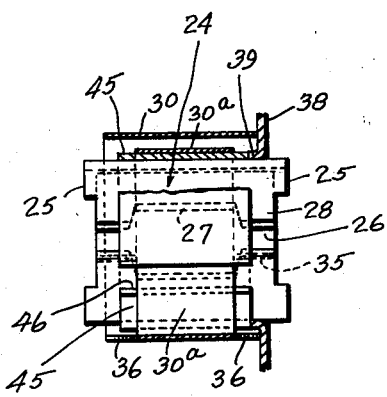
Fig. 10 is a fragmentary median section on line 10—10 of Fig. 7 with some parts shown in elevation.

In Figs. 7, 9 and 10, sleeve 45 is shown as having the same wall thickness as drum flange 39, but my invention is not necessarily limited to this or any other specific thickness for the sleeve. A thickness equal to the flange is probably the maximum useful thickness, since a thicker sleeve may be used but no added advantage is derived from the increased thickness. On the other hand, the minimum thickness of the sleeve depends somewhat upon the thickness of the spring since it is desirable that the sleeve plus one turn of the spring have a combined thickness equal to or greater than the radial thickness of flange 39 on the drum. The sleeve wall may have any desired thickness in between these two limits which permit a substantial range of sizes.

The spring initially wraps around the outside of the sleeve, rather than the axle itself as in Fig. 6. The larger diameter causes spring shoulder 36 to be farther out from the axis of the drum than it would be without the sleeve, other things remaining the same; and the net result is that the length L of notch 34 may be shortened.

Under the conditions illustrated wherein the sleeve wall is the same thickness as the drum flange, the spring is initially spaced far enough outwardly from the axle that it does not engage the drum flange, almost without reference to the length of notches 34. Of course under these conditions the minimum length of the notch 34 is that required to pass through the axle and sleeve with adequate clearances for assembly; but it is better to have a longer than minimum notch. Actually, no hard and fast limitations can be placed upon the length L of the notch, nor is such necessary because substantial variations are satisfactory.

For example, assume that the sleeve and spring are each of approximately equal thickness and together total the thickness of the drum flange 39. Then a notch of length L slightly in excess of the external circumference of the sleeve is satisfactory even though the spring lies in contact with the sleeve for one complete turn since that turn adds to the effective thickness of the sleeve. As either the sleeve is made thicker or the spring is made thicker and therefore becomes stiffer so that it lies in contact with the sleeve for a shorter portion of the total circumference, the length of the notch may be decreased accordingly. The desirability of a relatively thick sleeve to offset the high flexibility of a relatively thin spring can be seen from Figs. 7, 9 and 10 in which the spring is illustrated as if it were sufficiently thin and limber that it lies in contact with the sleeve and then with the first turn of the spring for a total of about one and one-quarter or more turns. Without a sleeve 45, the dimension L of the notch would necessarily be about two or more times the external circumference of axle 24 as one turn is required in lieu of the sleeve; but with the sleeve shown the notch length in the same spring may be safely decreased to slightly in excess of one circumference. In theory at least, a still shorter notch may be used but it is undesirable in practice because of the small clearance created by so thin a spring.

Having described and illustrated a preferred form of my invention, and indicated certain modifications thereof, it will be understood that various changes in my improved sash balance may be made by persons skilled in the art without departing from the spirit and scope of my invention. For example, it will be understood from the above description that various changes in the sizes and proportions of the parts may be made. Consequently, I wish the foregoing disclosure to be considered as illustrative of, rather than limitative upon, the appended claims.

I claim:

1. In a spring sash balance, the combination comprising: a stationary axle, the axle being hollow and having a longitudinally extending slot at one side, the slot having an intermediate portion of increased width; and a spiral spring connected at its inner end to the axle, the spring near its inner end having a section of reduced width providing a shoulder engaging the inside of the axle at one side of the slot with the narrowed portion of the spring extending out of the axle through the intermediate portion of the slot.

2. In a spring sash balance, the combination as in claim 1 in which the shoulder is spaced from the end of the spring by a distance equal to substantially ¾ the length of the inside diameter of the axle.

3. In a spring sash balance, the combination as in claim 1 in which the length of the section in the spring of reduced width is at least as long as the circumference of the axle.

4. In a spring sash balance, the combination comprising: a stationary axle, the axle being hollow and having a longitudinally extending slot at one side, the slot having an intermediate section of increased width; and a spiral spring connected at its inner end to the axle, the spring near its inner end having a section of reduced width providing a shoulder engaging the inside of the axle at one side of the slot with the narrowed portion of the spring extending out of the axle through the intermediate portion of the slot; and a sleeve loosely mounted on the axle spacing the initial turn of the spring from the axle and having a longitudinally extending slot through which the narrowed portion of the spring passes.

5. In a spring sash balance, a combination comprising: a stationary axle, the axle being hollow and having a longitudinally extending slot at one side, the slot having an intermediate section of increased width; a drum rotatable about the axle and provided with a wall at one side a portion of which is drawn inwardly and axially to form a bearing flange around a central opening through which the axle extends to rotatably support the drum; and a spiral spring connected at its outer end to the drum and at its inner end to the axle, the inner end of the spring having a notch at each side forming a pair of shoulders closely spaced from the end of the spring and located at each side of a central narrowed portion of the spring, the shoulders having a depth slightly in excess of the length of the drum flange measured parallel to the axis of the drum and engaging the inside of the axle when the narrowed portion of spring extends out of the axle through the intermediate portion of the slot, the spring for the major portion of its length having a width substantially equal to the inside depth of the drum.

6. In a spring sash balance, the combination comprising: a hollow stationary axle having a longitudinally extending slot in one side, the slot having an intermediate portion of increased width; a drum rotatable about the axle and having a wall at one side a portion of which is drawn axially of the drum to form a bearing flange around a central opening through which the axle extends; and a spiral spring connected at its outer end to the drum and at its inner end to the axle, the spring near its inner end having a section of reduced width providing a shoulder engaging the inside of the axle with the narrowed portion of the spring extending out of the axle through the intermediate portion of the slot, the depth of the shoulder being in excess of the length of the drum flange measured parallel to the axis of the drum.

7. In a spring sash balance, the combination comprising: a hollow stationary axle having at one side a longitudinally extending slot that has an intermediate section of increased width; a drum rotatable about the axle and having a wall at one side a portion of which is drawn axially to form a bearing flange around a central opening and around the axle; a spiral spring connected at one end to the drum and at the other end to the axle, the spring having near its inner end a section of reduced width providing a shoulder engaging the inside of the axle with the narrowed portion of the spring extending outwardly of the axle through the intermediate portion of the slot; and an annular sleeve loosely mounted on the axle and spacing the initial turn of the spring from the axle, said sleeve having a longitudinally extending slot through which the narrowed portion of the spring passes and the thickness of the sleeve wall being substantially equal to the thickness of the drum flange.

AXEL W. ANDERBERG.

References Cited in the file of this patent

UNITED STATES PATENTS

| Number | Name | Date |
| --- | --- | --- |
| 1,430,138 | Wread | Sept. 26, 1922 |
| 1,898,584 | Mantz | Feb. 21, 1933 |
| 2,242,650 | Mantz | May 20, 1941 |
| 2,534,968 | Haas | Dec. 19, 1950 |